US 8,445,785 B2

(12) United States Patent
Fujimoto et al.

(10) Patent No.: US 8,445,785 B2
(45) Date of Patent: May 21, 2013

(54) POLYBUTYLENE NAPHTHALATE-BASED RESIN COMPOSITION AND ELECTRIC WIRE USING THE POLYBUTYLENE NAPHTHALATE-BASED RESIN COMPOSITION (75) Inventors: Kenichiro Fujimoto, Hitachi (JP); Tomiya Abe, Hitachi (JP); Hitoshi Kimura, Hitachi (JP); Katsuhisa Shishido, Hitachinaka (JP); Akira Suzuki, Hitachi (JP); Takuya Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 395 days.

(21) Appl. No.: 12/582,944

(22) Filed: Oct. 21, 2009

(65) Prior Publication Data
US 2010/0101827 A1 Apr. 29, 2010

(30) Foreign Application Priority Data

Oct. 23, 2008 (JP) ................................ 2008-273132
Aug. 6, 2009 (JP) ................................ 2009-182973

(51) Int. Cl.
*H01B 7/00* (2006.01)
(52) U.S. Cl.
USPC .................... 174/110 R; 174/110 SR; 174/36
(58) Field of Classification Search
USPC ................. 174/110 R, 113 R, 120 R, 120 SR
See application file for complete search history.

(56) References Cited

U.S. PATENT DOCUMENTS

| | | | |
|---|---|---|---|
| 6,037,423 A * | 3/2000 | Nagano et al. ................. 525/438 |
| 6,242,097 B1 * | 6/2001 | Nishiguchi et al. ............ 428/383 |
| 6,579,952 B1 * | 6/2003 | Niki et al. ................. 525/440.12 |
| 6,593,434 B1 * | 7/2003 | Watanabe ....................... 525/437 |
| 6,608,256 B2 * | 8/2003 | Suzuki et al. ................ 174/117 F |
| 6,924,332 B2 * | 8/2005 | Onishi et al. .................... 524/189 |
| 7,196,123 B2 * | 3/2007 | Watanabe ....................... 523/456 |
| 7,518,064 B2 * | 4/2009 | Morioka et al. ........... 174/120 R |
| 7,541,544 B2 * | 6/2009 | Inoue et al. ................ 174/110 R |
| 7,612,131 B2 * | 11/2009 | Yamada ......................... 524/126 |
| 2003/0024729 A1 | 2/2003 | Suzuki et al. |
| 2004/0010092 A1 * | 1/2004 | Watanabe ....................... 525/418 |
| 2008/0081873 A1 * | 4/2008 | Kanae et al. ..................... 525/63 |
| 2008/0167406 A1 * | 7/2008 | Yamada ......................... 524/116 |

FOREIGN PATENT DOCUMENTS

| | | |
|---|---|---|
| JP | 6172626 A | 6/1994 |
| JP | 6240121 A | 8/1994 |
| JP | 11-001581 | 1/1999 |
| JP | 2000239439 | 3/2001 |

(Continued)

OTHER PUBLICATIONS

European Search Report for EP 09013375 (corresponding EP application). Search completed Feb. 10, 2011.

(Continued)

*Primary Examiner* — William H Mayo, III
(74) *Attorney, Agent, or Firm* — Martin Fleit; Paul D. Bianco; Fleit Gibbons Gutman Bongini & Bianco PL (57) ABSTRACT

A polybutylene naphthalate-based resin composition contains polybutylene naphthalate resin, a polyester block copolymer, and magnesium hydroxide; and an electric wire uses a polybutylene naphthalate-based resin composition, with an insulated coating layer formed on a conductor, by using a polybutylene naphthalate-based resin composition containing polybutylene naphthalate resin, a polyester block copolymer, and magnesium hydroxide as an insulating material.

21 Claims, 2 Drawing Sheets

FOREIGN PATENT DOCUMENTS

| JP | 2001-316533 | 11/2001 |
|---|---|---|
| JP | 2002249654 | 9/2002 |
| JP | 2002-358837 | 12/2002 |
| JP | 2004-193117 | 7/2004 |
| JP | 2005-213441 | 8/2005 |
| JP | 2005-281465 | 10/2005 |
| JP | 2006-111655 | 4/2006 |
| JP | 2006-111873 | 4/2006 |
| JP | 2006-152122 | 6/2006 |
| JP | 2007-045952 | 2/2007 |
| JP | 2007045952 A | 2/2007 |
| JP | 2008159508 A | 7/2008 |

OTHER PUBLICATIONS

Office Action issued on Jun. 20, 2012 in the corresponding Japanese patent application (Apppl. No. 2009-182973).

Office Action issued on Mar. 22, 2012 in corresponding Chinese patent application (appl No. 200910179757.0).

Journal of Salt Lake Research, vol. 15, No. 2, Jun. 2007, p. 62-72.

English language translation of portion of Journal of Salt Lake Research, vol. 15, No. 2, Jun. 2007, p. 62-72.

* cited by examiner

POLYBUTYLENE NAPHTHALATE-BASED RESIN COMPOSITION AND ELECTRIC WIRE USING THE POLYBUTYLENE NAPHTHALATE-BASED RESIN COMPOSITION

BACKGROUND

1. Technical Field

The present invention relates to a polybutylene naphthalate-based resin composition used as an insulating material and an electric wire using the polybutylene naphthalate-based resin composition. The electric wire of the present invention is an insulated wire including a single-layered electric wire and multi layered-electric wire. Also, the electric wire of the present invention includes a cable.

2. Description of Related Art

Conventionally, as an electric insulating material, an insulating material normally made of polyvinyl chloride resin (PVC) has been used. Such an insulating material made of PVC is excellent in an aspect of having a high practical characteristic at a low cost. However, due to generation of smoke including hazardous gas by combustion, materials excluding PVC have been requested in recent years.

In a transport field of automobiles and trains, etc, in order to save energy, electric wires are requested to be made light and thin, as a vehicle body is made to be lighter and space-saving in wiring is promoted.

When a conventional PVC material is applied to such a lightening/thinning of the electric wire, there is a problem that requests characteristics such as flame retardant property and abrasion resistance can not be achieved. Further, in recent years, in order to prevent a great social confusion that occurs in skyscraper fire and fire of cables that extend all around underground mall and subway, etc, flame resistance and suppression of smoke emission at the time of combustion are desired. In this point also, the requests can not be satisfied by the PVC material.

Meanwhile, polyester resin, being an engineering plastic polymer, above all, polybutylene terephthalate (PBT) is a crystalline polymer, and is used in a fuel tube for an automobile and a liquid crystal glass polishing device member, and a semiconductor-related member, etc, by utilizing characteristics such as heat resistance, mechanical strength, gas barrier property, chemical resistance, abrasion resistance, low elution property, and moldability (for example, see patent documents 1 to 3).

These engineering plastic have the aforementioned characteristics, and therefore there is a prospect that the lightening/thinning of the electric wires is achieved.

Patent Documents (Patent document 1) Japanese Patent Laid Open Publication No. 2005-281465

(Patent document 2) Japanese Patent Laid Open Publication No. 2006-152122

(Patent document 3) Japanese Patent Laid Open Publication No. 2007-45952

(Patent document 4) Japanese Patent Laid Open Publication No. 2006-111655

(Patent document 5) Japanese Patent Laid Open Publication No. 2006-111873

(Patent document 6) Japanese Patent Laid Open Publication No. 2005-213441

(Patent document 7) Japanese Patent Laid Open Publication No. 2004-193117

(Patent document 8) Japanese Patent Laid Open Publication No. 2002-358837

(Patent document 9) Japanese Patent Laid Open Publication No. 2001-316533

(Patent document 10) Japanese Patent Laid Open Publication No. 11-1581

SUMMARY OF THE INVENTION

However, polyester resin is a crystalline polymer and has a problem that a degree of crystallization is changed in manufacturing steps or under a specific environment, and emission of smoke at the time of combustion is hardly suppressed only by the polyester resin. Particularly, crystallization is progressed by heat treatment and there is a risk of reducing tensile elongation characteristics, which are important characteristics as an insulating material of the electric wire.

Patent documents 4 and 5 propose to improve the degree of crystallization by applying heat treatment and adding crystallization accelerator to the polyethylene resin, for improving mechanical strength, high speed moldability, and productivity. However, if the crystallization is progressed, it appears that the elongation characteristics are deteriorated.

Also patent document 6 suggests that by introducing a bendable monomer as a raw material of the polyester resin, progress of the crystallization can be suppressed, but there is no description regarding the elongation characteristics. Further in patent document 7, it is found that by adding to the polyester resin, resin containing a functional group having reactivity with polyester-based resin, occurrence of crazing is suppressed, reduction of an insulation breakdown voltage is suppressed, and excellent high temperature insulation characteristic can be obtained, but there is no description regarding the elongation characteristics of the electric wire insulating material when applied with heat treatment.

Further, patent document 8 proposes thermoplastic aromatic polyester and a specific polyester block copolymer, olefin-acrylic acid ester copolymer modified with a glycidyl compound, and a composition containing a phosphorous flame retardant as an arbitrary component. However, use of the phosphorous flame retardant is not suitable for a trend to a non-phosphorous retardant, which is further requested in the market, although the phosphorus retardant is a non-halogen substance.

Also, regarding a smoke emission property, patent documents 9 and 10 suggest that by adding magnesium hydroxide, flame retardant property and low smoke emission property are achieved. However, in each case, polyolefin resin is applied to a base polymer, and therefore it would be difficult to make an electric wire insulator thinner.

Therefore, an object of the present invention is to provide a polybutylene naphthalate-based resin composition having heat resistance, flame retardant property, abrasion resistance, and low smoke emission property, excellent in elongation characteristics, and not containing a halogen compound, and an electric wire using the polybutylene naphthalate-based resin composition.

According to a first aspect of the present invention, there is provided a polybutylene naphthalate-based resin composition containing polybutylene naphthalate resin, polyester block copolymer, and magnesium hydroxide.

Preferably, the polybutylene naphthalate-based resin composition contains 40 to 150 parts by weight (pts. wt.) of the polyester block copolymer, 10 to 30 pts. wt. of the magnesium hydroxide, 0.5 to 5 pts. wt. of a hydrolysis inhibitor, and 0.5 to 5 pts. wt. of an inorganic porous filler, with respect to 100 pts. wt. of the polybutylene naphthalate resin.

Also preferably, the polybutylene naphthalate-based resin composition contains 50 to 150 pts. wt. of the polyester block copolymer, 10 to 30 pts. wt. of magnesium hydroxide, 2 to 7 pts. wt. of the hydrolysis inhibitor, and 0.5 to 5 pts. wt. of the inorganic porous filler, with respect to 100 pts. wt. of the polybutylene naphthalate resin.

Also, according to other aspect of the present invention, there is provided an electric wire using a polybutylene naphthalate-based resin composition, with an insulated coating layer formed on a conductor, by using a polybutylene naphthalate-based resin composition containing polybutylene naphthalate resin, a polyester block copolymer, and magnesium hydroxide as an insulating material.

Preferably, the polybutylene naphthalate-based resin composition contains 40 to 150 pts. wt. of the polyester block copolymer, 10 to 30 pts. wt. of the magnesium hydroxide, 0.5 to 5 pts. wt. of a hydrolysis inhibitor, and 0.5 to 5 pts. wt. of an inorganic porous filler, with respect to 100 pts. wt. of the polybutylene naphthalate resin.

Further, preferably the polybutylene naphthalate-based resin composition contains 50 to 150 pts. wt. of the polyester block copolymer, 10 to 30 pts. wt. of the magnesium hydroxide, 2 to 7 pts. wt. of the hydrolysis inhibitor, and 0.5 to 5 pts. wt. of the inorganic porous filler, with respect to 100 pts. wt. of the polybutylene naphthalate resin.

DESCRIPTION OF PREFERRED
EMBODIMENTS OF THE INVENTION

A preferred embodiment of the present invention will be described in detail hereinafter.
[Polybutylene Naphthalate-Based Resin Composition]

A polybutylene naphthalate-based resin composition of an embodiment of the present invention contains polybutylene naphthalate resin (A), a polyester block copolymer (B), and magnesium hydroxide (C).

More preferably, the polybutylene naphthalate-based resin composition according to a first embodiment of the present invention is the polybutylene naphthalate-based resin composition containing 40 to 150 pts. wt. of the polyester block copolymer (B), 10 to 30 pts. wt. of the magnesium hydroxide (C), 0.5 to 5 pts. wt. of the hydrolysis inhibitor (D), and 0.5 to 5 pts. wt. of the inorganic porous filler (E), with respect to 100 pts. wt. of the polybutylene naphthalate resin (A).

Also more preferably, the polybutylene naphthalate-based resin composition according to a second embodiment of the present invention is the polybutylene naphthalate-based resin composition containing 50 to 150 pts. wt. of the polyester block copolymer (B), 10 to 30 pts. wt. of the magnesium hydroxide (C), 2 to 7 pts. wt. of the hydrolysis inhibitor (D), and 0.5 to 5 pts. wt. of the inorganic porous filler, with respect to 100 pts. wt. of the polybutylene naphthalate resin (A).

Next, the aforementioned each component (A) to (E) will be described.

<Polybutylene Naphthalate Resin (A)>

Polybutylene naphthalate resin (PBN) in this embodiment is a polyester mainly composed of naphthalene dicarboxylic acid, preferably naphthalene-2,6-dicarboxylic acid as an acid component, and mainly composed of 1,4-butanediol as a glycol component, namely which is a polyester, with a whole part or a major part of a repeating unit (normally 90 mol % or more and preferably 95 mol % or more) being as butylene naphthalate dicarboxylate.

Further, regarding this polyester, the next component can be copolymerized in a range not impairing physical properties. For example, for acid components, aromatic dicarboxylic acid other than naphthalenedicarboxylic acid, for example, phthalic acid, isophthalic acid, terephthalic acid, diphenyl dicarboxylic acid, diphenyl ether dicarboxylic acid, diphenoxyethane dicarboxylic acid, diphenylmethane dicarboxylic acid, diphenyl ketone dicarboxylic acid, diphenyl sulfide dicarboxylic acid, diphenylsulfone dicarboxylic acid, aliphatic dicarboxylic acid, for example, succinic acid, adipic acid, sebacic acid, cycle aliphatic dicarboxylic acid, for example, cyclohexane dicarboxylic acid, tetralindicarboxylic acid, and decalindicarboxylic acid, etc, can be given.

As glycol components, ethylene glycol, propylene glycol, trimethylene glycol, pentamethylene glycol, hexamethylene glycol, octamethylene glycol, neopentyl glycol, cyclohexanedimethanol, xylylene glycol, diethylene glycol, polyethylene glycol, bisphenol A, catechol, resorcinol, hydrochinone, dihydroxydiphenyl, dihydroxydiphenyl ether, dihydroxydiphenyl methane, dihydroxydiphenyl ketone, dihydioxydiphenyl sulfide, dihydroxydiphenyl sulfone, can be given.

As oxycarboxylic acid components, oxy benzonate, hydroxynaphthoic acid, hydroxy diphenyl carboxylic acid, ω-hydroxy capric acid, etc, can be given for example.

Note that a compound of 3-functional groups or more, for example, glycerin, trimethyl propane, pentaerythritol, trimellitic acid, and pyromellitic acid may be copolymerized in a range not substantially losing a molding performance of polyester.

Such a polyester can be obtained by polycondensing naphthalene dicarboxylic acid and/or its functional derivative and butylene glycol and/or its functional derivative, by using a conventional publicly-known aromatic polyester manufacturing method.

The concentration of a terminal carboxyl group of PBN used in this embodiment is not particularly limited, but less concentration is desirable.
<Polyester Block Copolymer (B)>

The polyester block copolymer (B) of this embodiment is a polyester block copolymer of 20 to 70 wt % of the hard segment (B1) and 80 to 30 wt % of the soft segment (B2).

Polyester block copolymer (B) used in this embodiment has the hard segment (B1), 60 mol % of which is mainly composed of polybutylene terephthalate. However, aromatic dicarboxylic acid containing a benzene ring or a naphthalene ring other than terephthalic acid, aliphatic dicarboxylic acid having 4 to 12 carbon atoms (C4-C12), and diol such as C2-C12 aliphatic diol other than tetramethylene glycol, and alicyclic diol such as cyclohexanedimethanol, may be copolymerized, and the ratio of this copolymerization is under 30 mol % or preferably under 10 mol % with respect to total dicarboxylic acid. It is preferable to set the copolymerization ratio to be small, because a melting point is high. However, copolymerization is sometimes performed to increase flexibility. However, when the ratio of the copolymerization is increased, compatibility between the polyester block copolymer (B) and the polybutylene naphthalate resin (A) is lowered, thus involving a problem that the abrasion resistance, which is a subject of the present invention, is impaired.

Meanwhile, a soft segment (B2) is made of polyester, with aromatic dicarboxylic acid set to be 99 to 90 mol %, and C6-C12 straight-chain aliphatic dicarboxylic acid set to be 1 to 10 mol % as acid components, and C6-C12 straight-chain diol as a diol component.

As the aromatic dicarboxylic acid, terephthalic acid and isophthalic acid can be given.

As C6-C12 straight-chain aliphatic dicarboxylic acid, adipic acid and sebacic acid, etc, can be given. An amount of the straight-chain aliphatic dicarboxylic acid is 1 to 10 mol % and further preferably 2 to 5 mol % of a total acid component of the polyester constituting a soft segment (B2). When it is 10 mol % or more, the compatibility with the polybutylene naphthalate resin (A) and the abrasion resistance are reduced. Meanwhile, when it is 1 mol % or less, the flexibility of the soft segment (B2) is impaired, and therefore as a result, softness of this polyester resin composition is impaired.

The diol component is C6-C12 straight-chain diol.

The polyester constituting the soft segment (B2) needs to be amorphous or have low crystallinity. Therefore, preferably isophthalic acid needs to be used as 20 mol % or more of the total acid component constituting the soft segment (B2). Moreover, in the soft segment (B2), it is also possible to copolymerize a slight amount of other component, in the same way as a hard segment (B1). However, the compatibility with the polybutylene naphthalate resin (A) is reduced and the abrasion resistance, which is the subject of the present invention, is impaired, and therefore the amount of the copolymerization amount is 10 mol % or less or preferably 5 mol % or less.

In the polyester block copolymer (B) of the present invention, a mixing ratio of the hard segment (B1) and the soft segment (B2) is preferably set, so that the hard segment (B1) occupies 20 to 70 wt %, and the soft segment (B2) occupies 80 to 30 wt %. Further, the amount ratio of a hard segment amount (wt %) and a soft segment amount (wt %) is 20-50 versus 80-50, or preferably 25-40 versus 75-60. This is because if the hard segment (B1) is beyond this ratio, there is a problem that the obtained polyester block copolymer (B) is hardened and is hardly used, and this is unfavorable. Meanwhile if the soft segment (B2) is beyond this ratio, the obtained polyester block copolymer (B) has less crystalline property and is hardly handled.

Segment lengths of the soft segment and the hard segment of the polyester block copolymer are, if expressed as molecular weights, about 500 to 7000, or preferably 800 to 5000. However, the segment lengths are not limited thereto. It is difficult to directly measure the segment lengths. However, the segment lengths can be estimated by using Flory's equation, for example from the composition of polyester constituting each of the soft segment and the hard segment, a melting point of the polyester composed of the component constituting the hard segment and a melting point of the obtained polyester block copolymer.

From this point, it is found that the melting point of the polyester block copolymer of this embodiment is an important item, and the melting point T[° C.] is within a range of $$To-5>T>To-60 \quad (1)$$

(Wherein To [° C.] is the melting point of a polymer composed of the component constituting the hard segment).

Namely, the melting point T is set to be a value between To-5 and To-60, preferably between To-10 and To-50, and further preferably between To-15 and To-40. Further, preferably the melting point is set so as to be 10° C. higher than T', being a melting point of a random copolymer, and preferably 20° C. higher than T', and when the melting point of the random copolymer can not be defined, the melting point is preferably set to be 150° C. or more and preferably set to be 160° C. or more.

When the polymer of the present invention is not the block copolymer but the random copolymer, this polymer is generally amorphous, and a glass transition temperature is low. Therefore, such a polymer is formed into a gel-like state, thus involving a practical problem that moldability is remarkably deteriorated and a surface is sticky. Therefore such a polymer can not be used practically.

As a manufacturing method of such a polyester block copolymer, there is a method of manufacturing the polymer constituting the soft segment and the hard segment respectively, and melting and mixing them so that the melting point is set to be lower than that of the polyester constituting the hard segment. This melting point is varied depending on a mixing temperature and time. Therefore, at the time point showing a state of a target melting point, preferably a catalyst deactivator such as a phosphorus oxyacid is added, to thereby deactivate a catalyst.

It is possible to use the polyester block copolymer of the present invention, with a specific viscosity measured in ortho chloro phenol at 35° C. set to be 0.6 or more and preferably set to be 0.8 to 1.5. This is because when the specific viscosity is lower, strength becomes low accordingly, and this is not preferable.

An addition amount of the polyester block copolymer of the first embodiment is 40 to 150 pts. wt. with respect to 100 pts. wt. of the polybutylene naphthalate resin. When the addition amount is under 40 pts.wt, the heat resistance is deteriorated, and when the addition amount is beyond 150 pts.wt, the abrasion resistance is deteriorated. The addition amount of the polyester block copolymer is more preferably 50 to 150 pts. wt. in the second embodiment, and by setting it to be 50 pts. wt. or more, further excellent heat resistance effect can be obtained.

<Magnesium Hydroxide (C)>

Properties of the magnesium hydroxide used in this embodiment are not particularly limited.

The addition amount of the magnesium hydroxide is 10 to 30 pts. wt. and more preferably 15 to 20 pts. wt., with respect to 100 pts. wt. of the polybutylene naphthalate resin. When the addition amount is less than 10 pts. wt., low smoke emission property of the present invention can not be sufficiently exhibited, and when the addition amount is more than 30 pts. wt., flexibility and the abrasion resistance are deteriorated when processed into an electric wire.

<Hydrolysis Inhibitor (D)>

The hydrolysis inhibitor used in this embodiment is preferably a compound having a carbodiimide skeleton, however is not limited thereto.

The addition amount of the hydrolysis inhibitor is 0.5 to 5 pts. wt. and more preferably 1 to 3 pts. wt., with respect to 100 pts. wt. of the polybutylene naphthalate resin, in the polybutylene naphthalate-based resin composition according to the first embodiment. When the addition amount is less than 0.5 pts. wt., durability of the present invention can not be sufficiently exhibited, and when the addition amount is more than 5 pts. wt., there is no flexibility when processed into the electric wire, and the hydrolysis inhibitor is transferred to a surface of the electric wire, thereby causing a failure of an outer appearance.

Further, the addition amount of the hydrolysis inhibitor is also 2 to 7 pts. wt., with respect to 100 pts. wt. of the polybutylene naphthalate resin, in the polybutylene naphthalate-based resin composition according to the second embodiment. In this case, when the addition amount is under 2 pts. wt., hydrolysis characteristics are excellent, but the abrasion resistance is deteriorated, and when the addition amount is beyond 7 pts. wt., the moldability is deteriorated.

<Inorganic Porous Filler (E)>

As the inorganic porous filler used in this embodiment of the present invention, fired clay is preferable, and its specific surface area is preferably set to be 5 $m^2/g$ or more.

The addition amount of the inorganic porous filler is preferably 0.5 to 5 pts. wt., and more preferably 1 to 3 pts. wt., with respect to 100 pts. wt. of the polybutylene naphthalate resin. If the content is excessively less, ions can not be sufficiently trapped, and an insulation resistance becomes small. Meanwhile, if the content is excessively great, dispersability and tensile characteristics are deteriorated, and this is not preferable.

Further, not only the fired clay but also zeolite, mesalite, anthracite, a perlite foamed body, and activated charcoal, may be acceptable as the inorganic porous filler.

<Others>

A pigment, a dye, a filler, a nucleating agent, a releasing agent, an antioxidant, a stabilizer, an antistatic agent, a lubricant, and others can also be blended and kneaded into the resin composition of this embodiment.

In the polybutylene naphthalate-based resin composition of this embodiment of the present invention, a thermoplastic resin other than the polybutylene naphthalate resin can be blended in a range not impairing an effect of the present invention. Polyester resins such as polyethylene terephthalate, polybutylene terephthalate, polytrimethylene terephthalate, polypropylene resin, and polyethylene resin, etc, can be given for example.

As a method of blending the aforementioned each kind of component into the polybutylene naphthalate resin, a publicly-known means can be used in an arbitrary stage immediately before a coating step of coating a conductor of the electric wire with an insulator. As a simplest method, a method of obtaining pellets by melting, mixing, and extruding the polybutylene naphthalate resin, polyester-polyester elastomer, hydrolysis inhibitor, and fired clay, etc, is used.

[Electric Wire Using the Polybutylene Naphthalate-Based Resin Composition]

Figure 1:
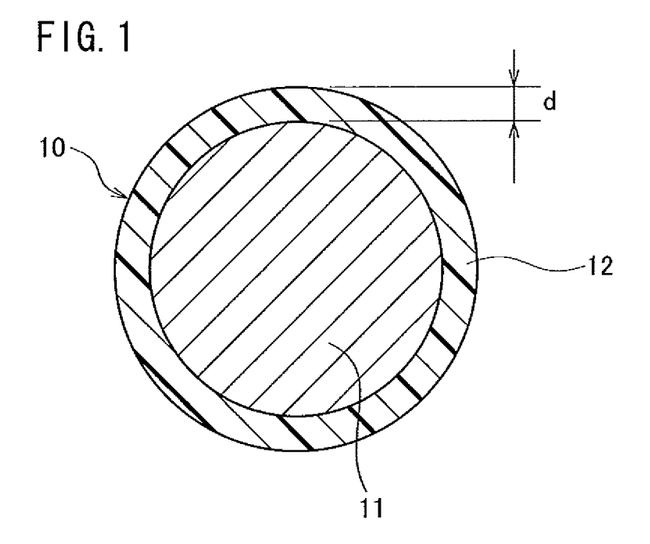
FIG. 1 is a cross sectional view showing an electric wire using a polybutylene naphthalate-based resin composition according to an embodiment of the present invention.

As shown in FIG. 1, the electric wire according to an embodiment of the present invention has a single layer coating structure in which an insulating coating layer made of the polybutylene naphthalate-based resin composition of the aforementioned embodiment is formed by extrusion molding, etc, on an outer periphery of a conductor (core wire) 11 of an electric wire 10. Thickness d of the insulating coating layer 12 is preferably set to be 0.1 to 0.5 mm. For example, copper or a copper alloy is used in the conductor 11, and hot-dip plating or electrolytic plating may be applied to a copper wire or a copper alloy wire, etc.

Figure 2:
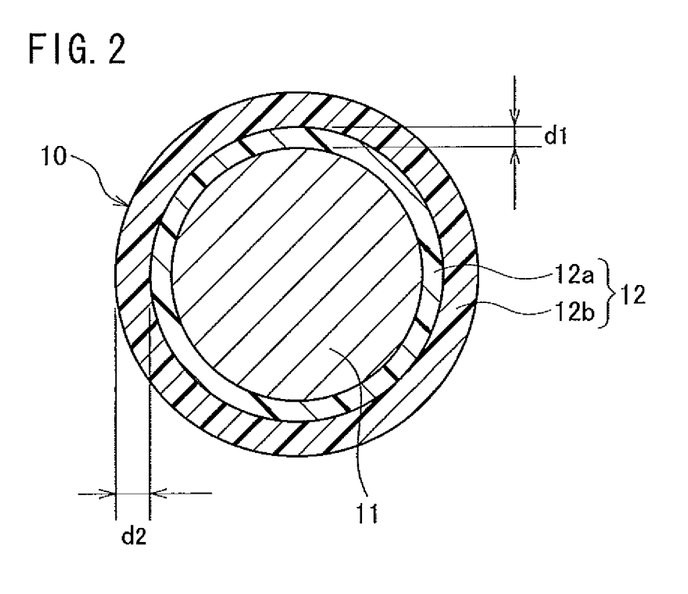
FIG. 2 is a cross sectional view showing the electric wire using the polybutylene naphthalate-based resin composition according to other embodiment of the present invention.

As shown in FIG. 2, the electric wire of other embodiment of the present invention has a two-layer coating structure in which a first insulating coating layer 12a coated with a polyester resin composition containing the polyester resin, the hydrolysis inhibitor, and the fired clay, is formed on the outer periphery of the conductor (core wire) 11 of the electric wire 10; and a second insulating coating layer 12b coated with the polybutylene naphthalate-based resin composition of the second embodiment, is formed on the outer periphery of the first insulating coating layer 12a. Thickness d1 of the first insulating coating layer 12a is preferably set to be 0.01 to 0.1 mm, and thickness d2 of the second insulating coating layer 12b is preferably set to be 0.1 to 0.5 mm.

Note that a cross-sectional shape of the conductor 11 is not limited to a circular shape shown in FIG. 1 and FIG. 2, and may be a flat-square shape, etc. Also, the conductor is not limited to a single wire, and may be a twisted wired in which a plurality of single wires are twisted. Further, the electric wire having an insulating coating structure of three layers or more may be acceptable. Moreover, the electric wire of the present invention is not limited to the electric wire (insulating electric wire) in which the conductor is covered with an insulating material, and includes a cable, with the outer periphery of the electric wire 10 as shown in FIG. 1 and FIG. 2 further covered with sheath, or a cable, with a plurality of electric wires 10 as shown in FIG. 1 and FIG. 2 bundled therein and its outer periphery covered with sheath, and a cable having other structure.

In the polyester resin composition used in the electric wire of the embodiment having a two layer coating structure shown in FIG. 2, the polyester resin is the polybutylene naphthalate resin (PBN), and the polyester resin composition contains 0.5 to 3 pts. wt. of the hydrolysis inhibitor and 0.5 to 3 pts. wt. of the fired clay, with respect to 100 pts. wt. of the polybutylene naphthalate resin.

The hydrolysis inhibitor is added for suppressing hydrolysis of the PBN. The addition amount is 0.5 to 3 pts. wt., and when the addition amount is under 0.5 pts. wt., a hydrolysis inhibiting effect can not be obtained, and when the addition amount is beyond 3 pts. wt., the moldability is gradually deteriorated and a material cost is increased.

The fired clay is added for improving an insulation resistance (electric characteristic). The addition amount is 0.5 to 3 pts. wt., and when the addition amount is under 0.5 pts. wt., an electric characteristic improving effect is decreased, and when the addition amount is beyond 3 pts. wt., an initial elongation is reduced.

As the polybutylene naphthalate resin, the hydrolysis inhibitor, and the fired clay used in the polyester resin composition, the same ones as the polybutylene naphthalate resin (A), the hydrolysis inhibitor (D), and the fired clay (E) in the polybutylene naphthalate-based resin composition, can be used respectively.

In the electric wire of this embodiment having a multi-layer coating structure, by giving the heat resistance and the abrasion resistance to each layer, an excellent abrasion resistance can be given, rather than a case of achieving compatibility of the heat resistance and abrasion resistance in the electric wire having a single-layer coating structure. Specifically, as main characteristics of the first and second insulating coating layers 12a, 12b, the heat resistance is given to the polyester resin composition constituting the first insulating coating layer 12a, and the abrasion resistance is given to the polybutylene naphthalate-based resin composition constituting the second insulating coating layer 12b.

EXAMPLES

Examples and comparative examples of the present invention will be described hereinafter in further detail. However, the present invention is not limited to these examples.

The electric wire having a single-layer coating structure was prepared by using the polybutylene naphthalate-based resin composition (alloy composition) having various blending compositions examined by the present invention, and characteristics evaluation thereof was conducted. Table 1 shows blending compositions of the polybutylene naphthalate-based resin compositions of the examples and the comparative examples and evaluation results.

In table 1, TQB-OT (product name) produced by TEIJIN CHEMICALS LTD. was used as the PBN (polybutylene naphthalate resin), and NUBERAN TRB-EL2 (product name) produced by TEIJIN CHEMICALS LTD. was used as the polyester block copolymer, MAGNESEES EP1-A (product name) produced by Konoshima Chemical Co., Ltd. was used as magnesium hydroxide, CARBODILITE HMV-8CA (product name) was used as the hydrolysis inhibitor, and SP-33 (product name) produced by Engelhard Corporation was used as the fired clay. In the next table 2 and table 3 also, the same materials as those of table 1 were used as the PBN, polyester block copolymer, magnesium hydroxide, hydrolysis inhibitor, and fired clay.

TABLE 2

Blending composition (pts. wt.)

| | PBN | Polyester block copolymer | Magnesium hydroxide | Hydrolysis inhibitor | Fired clay |
|---|---|---|---|---|---|
| Example 6 | 100 | 67 | 15 | 5 | 1 |
| Example 7 | 100 | 100 | 15 | 3 | 1 |
| Example 8 | 100 | 100 | 15 | 5 | 1 |
| Example 9 | 100 | 100 | 20 | 3 | 1 |
| Comparative example 11 | 100 | — | — | — | — |
| Comparative example 12 | 100 | 43 | 15 | 1 | 1 |
| Comparative example 13 | 100 | 67 | 15 | 1 | 1 |
| Comparative example 14 | 100 | 100 | 15 | 1 | 1 |

TABLE 1

(Blending: pts. wt.)

| | | Examples | | | | | Comparative examples | | | | | | | | | |
|---|---|---|---|---|---|---|---|---|---|---|---|---|---|---|---|---|
| | | 1 | 2 | 3 | 4 | 5 | 1 | 2 | 3 | 4 | 5 | 6 | 7 | 8 | 9 | 10 |
| Blending composition | PBN | 100 | 100 | 100 | 100 | 100 | 100 | 100 | 100 | 100 | 100 | 100 | 100 | 100 | 100 | 100 |
| | Polyester block copolymer | 67 | 67 | 100 | 100 | 150 | — | — | 25 | 25 | 25 | 30 | 160 | 100 | 100 | 233 |
| | Magnesium hydroxide | 15 | 15 | 20 | 20 | 15 | — | 10 | — | — | — | 15 | 15 | — | 40 | — |
| | Hydrolysis inhibitor | 3 | 3 | 3 | 1 | 3 | — | — | — | 10 | — | 1 | 1 | 1 | — | — |
| | Fired clay | 1 | 2 | 2 | 2 | 2 | — | — | — | — | 2 | 1 | 1 | 2 | — | — |
| Evaluation | Hydrolysis resistance test | ○ | ○ | ○ | ○ | ○ | X | X | X | † | X | ○ | ○ | ○ | † | X |
| | Flame retardant property | ○ | ○ | ○ | ○ | ○ | X | X | X | | X | ○ | ○ | ○ | | ○ |
| | Tensile elongation after heat treatment (%) | ○ | ○ | ○ | ○ | ○ | X | X | X | | X | X | ○ | ○ | | ○ |
| | Insulation resistance (MΩ · km) | ○ | ○ | ○ | ○ | ○ | X | X | X | | ○ | ○ | ○ | ○ | | X |
| | Abrasion resistance | ○ | ○ | ○ | ○ | ○ | ○ | ○ | ○ | | X | ○ | X | ○ | | X |
| | Smoke emitting concentration | ○ | ○ | ○ | ○ | ○ | X | ○ | X | | X | ○ | ○ | X | | X |
| | Passing status | ○ | ○ | ○ | ○ | ○ | X | X | X | | X | X | X | X | | X |

○: Pass
X: Failure
†: Outer appearance failure of electric wire

Also similarly, the electric wire having the single-layer coating structure was prepared by using the polybutylene naphthalate-based resin composition having various blending compositions shown in table 2, and its characteristic evaluation was conducted. Table 2 shows the blending composition of the polybutylene naphthalate-based resin composition of the examples and the comparative examples.

Further, the electric wire having the two-layer coating structure was prepared by using the polybutylene naphthalate-based resin composition (i) and the polyester resin composition (ii) having the blending composition shown in table 3, and its characteristic evaluation was conducted. Table 3 shows the polybutylene naphthalate-based resin composition (i) and the polyester resin composition (ii) of the examples and comparative examples.

Table 4 shows results of the evaluation conducted for the blending composition shown in table 2 and table 3.

TABLE 3

| | | | Example 10 | Comparative example 15 |
|---|---|---|---|---|
| Blending composition (pts. wt.) | Polybutylene naphthalate-based resin composition (i) | PBN | 100 | 100 |
| | | Polyester block copolymer | 100 | 100 |
| | | Magnesium hydroxide | 20 | 20 |
| | | Hydrolysis inhibitor | 1 | 1 |
| | | Fired clay | 1 | 1 |
| | Polyester resin composition (ii) | PBN | 100 | 100 |
| | | Hydrolysis inhibitor | 1 | 1 |
| | | Fired clay | 1 | 1 |

TABLE 3-continued

|  |  | Example 10 | Comparative example 15 |
|---|---|---|---|
| Electric wire coating structure | Inner layer (First coating layer) | (ii) | (i) |
|  | Outer layer (Second coating layer) | (i) | (ii) |

TABLE 4

|  | Abrasion resistance characteristic | Hydrolysis resistance | Flame retardant property | Tensile elongation retension after heat treatment | Smoke emitting concentration | Insulating coating structure | Passing status |
|---|---|---|---|---|---|---|---|
| Example 6 | ○ | ○ | ○ | ○ | ○ | One layer | Pass |
| Example 7 | ○ | ○ | ○ | ○ | ○ | One layer | Pass |
| Example 8 | ○ | ○ | ○ | ○ | ○ | One layer | Pass |
| Example 9 | ○ | ○ | ○ | ○ | ○ | One layer | Pass |
| Example 10 | ○ | ○ | ○ | ○ | ○ | Two layers | Pass |
| Comparative example 11 | ○ | X | X | X | X | One layer | Failure |
| Comparative example 12 | ○ | ○ | ○ | X | ○ | One layer | Failure |
| Comparative example 13 | X | ○ | ○ | ○ | ○ | One layer | Failure |
| Comparative example 14 | X | ○ | ○ | ○ | ○ | One layer | Failure |
| Comparative example 15 | ○ | ○ | X | ○ | ○ | Two layers | Failure |

○: Pass
X: Failure

[Manufacture of the Electric Wire]

An electric wire manufacture by using a resin component having blending compositions shown in table 1 was performed as follows.

The obtained polybutylene naphthalate-based resin composition was dried in a hot blast thermostat vessel at 130° C. for 8 hours, which was then extrusion-molded, with a coating thickness of 0.3 mm, around a tin plating annealed copper wire (center conductor) having a diameter of 1.4 mm. In the extrusion molding, a dice having a diameter of 4.2 mm and a nipple having a diameter of 2.0 mm were used, and an extrusion temperature was set to be 240° C. to 260° C. at a cylinder part, and set to be 260° C. at a head part. A drawing speed was set to be 5 m/minute.

The manufacture of the electric wire by the resin composition of the blending composition shown in table 2 and table 3 was performed as follows.

(1) The Electric Wire of the Single-Layer Coating Structure

The obtained polybutylene naphthalate-based resin composition was dried in the hot blast thermostat vessel at 130° C. for 8 hours, to thereby coat the outer periphery of the tin plating annealed copper wire (center conductor) having a diameter of 1.4 mm, with the polybutylene naphthalate resin composition by extrusion molding, with a coating thickness of 0.25 mm. In the extrusion molding, the dice having a diameter of 4.2 mm and the nipple having a diameter of 2.0 mm were used, and the extrusion temperature was set to be 240° C. to 260° C. at the cylinder part and set to be 260° C. at the head part. The drawing speed was set to be 6 m/minute.

(2) The Electric Wire Having a Two-Layer Coating Structure

The obtained polybutylene naphthalate-based resin composition (i) and the polyester resin composition (ii) were dried in the hot blast thermostat vessel at 130° C. for 8 hours, to thereby directly coat the outer periphery of the tin plating annealed copper wire having a diameter of 1.4 mm, with the polyester resin composition (ii), by extrusion molding, with a coating thickness of 0.1 mm. Further, the outer periphery of the electric wire is coated with the polybutylene naphthalate-based resin composition (i) by extrusion molding, with a coating thickness of 0.15 mm. In the extrusion molding, the dice having the diameter of 4.2 mm and the nipple having the diameter of 2.0 mm were used, and the extrusion temperature was set to be 290° C. to 260° C. at the cylinder part, and set to be 260° at the head part. The drawing speed was set to be 8 m/minute.

[Evaluation Method]

The evaluation in table 1 was conducted as follows.
(Hydrolysis Resistance Test)

A sample after extracting the core wire (center conductor) was allowed to stand for 30 days in a thermohygrostat vessel, with a temperature set to be 85° C. and humidity set to be 85% RH. Then, a tensile test was conducted, and the sample with tensile elongation of 200% or more was defined as "o" (pass), the sample of a practical level, with the tensile elongation of 100% or more and under 200% was defined as "Δ", and the sample with the tensile elongation of under 100% was defined as "x" (failure).

(Flame Retardant Property)

Figure 3:
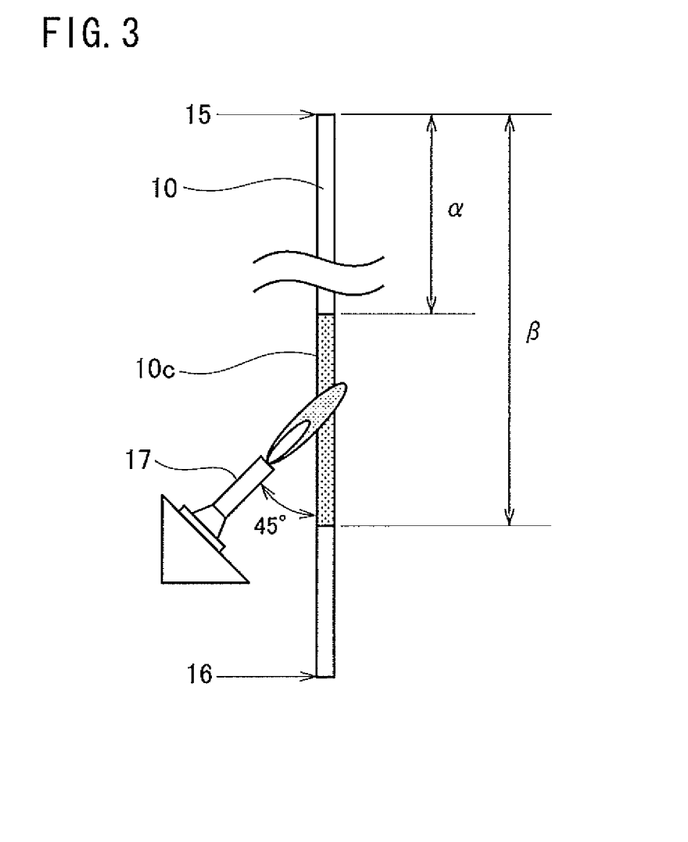
FIG. 3 is a view explaining an IEC combustion test method of the electric wire conducted in examples of the present invention.

The flame retardant property was measured by a combustion test. The prepared electric wire was tested, pursuant to an IEC combustion test method (IEC 60332-1). As shown in FIG. 3, the electric wire 10 was vertically held by an upper support part 15 and a lower support part 16, then the electric wire 10 was exposed to a flame of a burner 17 at a position of 475±5 mm from the upper support part 15 and at an angle of 45° for a defined burning time, and thereafter the burner 17 was removed, the flame was extinguished, and a carbonized part 10c of the electric wire 10 was checked.

Regarding a distance a from the upper support part 15 to an upper end of the carbonized part 10c, 540 mm or less of distance β from the upper support part 15 to a lower end of the carbonized part 10c was defined as pass (o), and a distance other than this range was defined as failure (x).

(Elongation after Heat Treatment)

Regarding the elongation after heat treatment, heat aging characteristic was measured by conducting a tensile test after conducting a heat aging test.

Heat Aging Test;

The sample after extracting the core wire (center conductor) of the prepared electric wire was subjected to heat treatment in a thermostat vessel at 150° C. for 96 hours, which was then allowed to stand for 12 hours at a room temperature, and thereafter the tensile test was conducted. The heat treatment was performed, pursuant to JIS C 3005.

Heat Aging Characteristic;

The sample prepared by the aforementioned heat aging test was measured at a tensile speed of 200 mm/min. The tensile test was conducted, pursuant to JIS C 3005. The sample with the tensile elongation of 200% or more was defined as "o" (pass), and the sample with the tensile elongation of under 200% was defined as "x" (failure).

(Measurement of Insulation Resistance)

The prepared electric wire was dipped into water at 90° C., and after the temperature of the insulator was fixed, measurement of the insulation resistance was executed, pursuant to JIS C 3005. The sample with the insulation resistance of 1.0 MΩ·km or more was defined as "o" (pass), and the sample of under 1.0 MS/8 km was defined as "x" (failure).

(Abrasion Characteristic)

Figure 4:
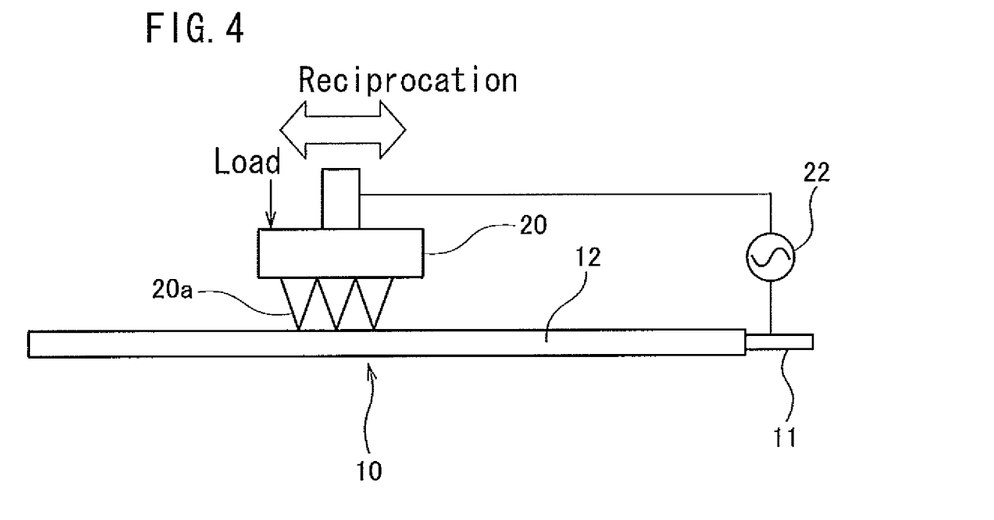
FIG. 4 is a view explaining an abrasion test of the electric wire conducted in the examples of the present invention.

An abrasion test was conducted by an abrasion test machine 20 shown in FIG. 4.

The prepared electric wire was placed in an atmosphere of a normal temperature, and a tip end 20a of the abrasion test machine 20 was brought into contact with an insulating coating layer 12 of the electric wire 10, while adding a load of 2 pounds (907 g) to the electric wire, then reciprocal motion of the abrasion test machine 20 was performed, and the numbers of times of the reciprocal motion were measured until short circuit was generated by contact of the tip end 20a with the conductor 11, in a state of applying power 22 between the conductor 11 of the electric wire 10 and the tip end 20a. The reciprocal motion of 100 numbers of times was defined as "o" (pass), and the reciprocal motion of under 100 numbers of times was defined as "x" (failure).

(Measurement of Smoke Emitting Concentration)

Impermeability of light due to smoke was measured, pursuant to IEC 60695-6-30. The impermeability was measured by Fleming's rule. A thickness of a test piece was set to be 0.5 mm. The smoke emitting concentration of under 100 was defined as "o" (pass), and the smoke emitting concentration of 100 or more was defined as "x" (failure).

The evaluation in table 4 was performed as follows.

(Hydrolysis Resistance)

The sample after extracting the core wire of the prepared electric wire, is allowed to stand for 30 days in a thermohygrostat vessel, with a temperature set to be 85° C. and humidity set to be 85% RH. Then, a tensile test was conducted, and the sample with the tensile elongation retention set to be 70% or more was defined as "o" (pass), and the sample with the tensile elongation retention set to be under 70% was defined as "x" (failure).

(The Tensile Elongation Retention after Heat Treatment)

Regarding the elongation after heat treatment, the heat aging characteristic was measured by conducting a tensile test.

Heat Aging Test;

The sample after extracting the core wire of the prepared electric wire, was subjected to heat treatment in a thermostat vessel at 150° C. for 96 hours, which was then allowed to stand for 12 hours at a room temperature, and thereafter the tensile test was conducted. The heat treatment was performed, pursuant to JIS C 3005.

Heat Aging Characteristic;

The sample prepared by the heat aging test was measured at a tensile speed of 200 mm/min. The tensile test was conducted pursuant to JIS C 3005. The sample with elongation retention ((initial elongation/elongation after heat aging)× 100) of 70% or more was defined as "o" (pass), and the elongation retention of under 70% was defined as "x" (failure).

(Abrasion Characteristic)

The abrasion test was conducted by the abrasion test machine 20 shown in FIG. 4.

The prepared electric wire was placed in an atmosphere of a normal temperature, and a tip end 20a of the abrasion test machine 20 was brought into contact with the insulating coating layer 12 of the electric wire 10, while adding a load of 2 pounds (907 g) to the electric wire, then reciprocal motion of the abrasion test machine 20 was performed, and the numbers of times of the reciprocal motion were measured until short circuit was generated by contact of the tip end 20a with the conductor 11, in a state of applying power 22 between the conductor 11 of the electric wire 10 and the tip end 20a.

The reciprocal motion of 150 numbers of times was defined as pass (o), and the reciprocal motion of under 150 numbers of times was defined as failure (x). Regarding the (flame retardant property) and the (smoke emitting concentration), being the other evaluated characteristics, the evaluation method same as that of table 1 was used.

[Examination on the Evaluation Result]

(Regarding Examples 1 to 5, and Comparative Examples 1 to 10 of Table 1)

From table 1, it is found that there is only the polybutylene naphthalate rein (PBN) as a coating material in the comparative example 1, and therefore although abrasion property is satisfactory, a target value can not be satisfied regarding the other characteristic.

Also, in comparative example 2, the polybutylene naphthalate resin (A) and the magnesium hydroxide (C) are added in a range of the present invention, and therefore although the target value is satisfied regarding the abrasion property and smoke emission property, the other characteristics are not achieved yet.

Further, in comparative example 3, the polybutylene naphthalate resin (A) and the polyester block copolymer (B) are added, the addition amount of the polyester block copolymer (B) is outside of the range of the present invention, and therefore although the target value is satisfied regarding only the abrasion property, the target value can not be satisfied regarding the other characteristics.

In comparative example 4 and comparative example 9, there was much more content of the hydrolysis inhibitor (D) and the magnesium hydroxide (C) than the contents defined in the range of the present invention, and therefore irregularities were generated on the surface of the electric wire and the outer appearance of the electric wire became defective, thus making it impossible to prepare the sample capable of withstanding the evaluation.

Also in comparative example 5, the polybutylene naphthalate resin (A), the polyester block copolymer (B), and the fired clay (E) are added, and although the target value can be satisfied regarding the abrasion property and the insulation resistance, the other characteristics can not be satisfied, because there is less addition amount of the polyester block copolymer (B), and the magnesium hydroxide (C) and the hydrolysis inhibitor (D) are not added.

In comparative example 6, the elongation characteristic after heat treatment can not be sufficiently exhibited, because there is less addition amount of the polyester block copolymer (B).

Further, in comparative example 7, the abrasion resistance is not sufficient, because there is more addition amount of the polyester block copolymer (B) than the addition amount described in the range of the present invention.

In comparative example 8, the polybutylene naphthalate resin (A), the polyester block copolymer (B), the hydrolysis inhibitor (D), and the fired clay (E) are added, and therefore the target value is satisfied regarding the elongation after heat treatment, flame retardant property, abrasion property, hydrolysis resistance, and insulation resistance. However, the target value can not be satisfied regarding the smoke emission property because the magnesium hydroxide is not added.

Further, in comparative example 10, the polybutylene naphthalate resin (A) and the polyester block copolymer (B) are added. However, due to more increased amount of the polyester block copolymer, although the elongation after heat treatment and the flame retardant property are defined as "pass", the target value is not satisfied regarding the abrasion property. Further, the magnesium hydroxide (C), the hydrolysis inhibitor (D) and the fired clay (E) are not added, and therefore the smoke emission property, the hydrolysis resistance, and the insulation resistance are defined as "failure".

Meanwhile, the examples 1 to 5 show the results of "pass" in all characteristics, because they are within the range of the present invention.

(Regarding Examples 6 to 9 and Comparative Examples 11 to 14 of Table 2)

As shown in table 4, in comparative example 11, there is only PBN, and therefore although the abrasion resistance is excellent, the other characteristics can not be satisfactory. In comparative example 12, there is less amount of the polyester copolymer (B), being a flexible component, than the amount defined in the range of the polybutylene naphthalate-based resin composition of the second embodiment. Therefore, further higher target value (70% or more) of the elongation retention after heat treatment can not be satisfied. Further, in comparative examples 13 and 14, the addition amount of the hydrolysis inhibitor is outside of the range of the polybutylene naphthalate-based composition of the second embodiment. Therefore, it is found that although the hydrolysis resistance is excellent, a higher target value (150 numbers of times of the reciprocal motion) than the target value of table 1 can not be satisfied, regarding the abrasion resistance. The addition amount of the hydrolysis inhibitor has a great influence on the abrasion resistance, and in a blending system of increased addition amount, an elasticity modulus of polymer is great. Therefore, it appears that the abrasion property is improved.

Meanwhile, examples 6 to 9 are within the range of the polybutylene naphthalate-based resin composition of the second embodiment, and therefore show the result of "pass" in which a higher target value is satisfied, particularly regarding the elongation retention after heat treatment and the abrasion resistance.

(Regarding Example 10 and Comparative Example 15 of Table 3)

In comparative example 15, the polybutylene naphthalate-based resin composition (i) of the second embodiment is used as an inner layer insulator (first insulation coating layer), and the polyester resin composition (ii) is used as an outer layer insulator (second insulation coating layer), and therefore the target value can not be satisfied regarding the flame retardant property.

Meanwhile, compared with comparative example 15, example 10 shows an electric wire insulator structure in which the resin composition is reversed in the inner layer insulator and the outer layer insulator. In this electric wire structure, all required values can be satisfied.

Note that in the aforementioned examples, the structure of the insulating electric wire for coating the insulating layer on the center conductor has been explained. However, the present invention is not limited thereto, and the resin composition of the present invention can also be used as a so-called sheath material of a cable for coating a cable group with sheath (jacket), with these insulating electric wires bundled therein.

Further, in the aforementioned examples, explanation has been given, with the center conductor as a single wire. However, the present invention is not limited thereto, and a twisted wire structure in which a plurality of single wires are twisted, may be acceptable, and also a structure in which a plurality of single wires are simply bundled, may be acceptable.

Further, in the aforementioned examples, an annealed copper wire is used as a material of the center conductor. However, the present invention is not limited thereto, and a hard-drawn copper wire or a copper alloy wire (for example, Cu—Sn alloy wire, Cu—Ag alloy wire, and Cu—Sn—In alloy wire) may also be acceptable.

Further, in the aforementioned examples, tin is selected as the material for plating the center conductor. However, the present invention is not limited thereto, and Pb—Sn alloy, Sn—Ag—Cu alloy, Sn—Ag—Cu—P alloy, Sn—Cu—P alloy, Sn—Cu alloy, and Sn—Bi alloy, etc, can also be used.

What is claimed is:

1. A polybutylene naphthalate-based resin composition consisting of a polybutylene napthalate resin, a polyester block copolymer, a magnesium hydroxide, a hydrolysis inhibitor, and an inorganic porous filler, wherein an amount of the polyester block copolymer is 40 to 150 pts. wt., an amount of the magnesium hydroxide is 10 to 30 pts. wt., an amount of the hydrolysis inhibitor is 0.5 to 5 pts. wt., an amount of the inorganic porous filler is 0.5 to 5 pts. wt., and an amount of the polybutylene naphthalate resin is 100 pts. wt.

2. The polybutylene naphthalate-based resin composition according to claim 1, wherein the polyester block copolymer is a polyester block copolymer having 20 to 70 wt % of a hard segment and 80 to 30 wt % of a soft segment, the hard segment made of polyester composed of 60 mol % or more of polybutylene terephthalate, and the soft segment made of polyester having 99 to 90 mol % of aromatic dicarboxylic acid and 1 to 10 mol % of C6-C12 straight-chain aliphatic dicarboxylic acid as acid components, and a C6-C12 straight-chain diol as a diol component, and wherein a melting point T [° C.] of the polyester block copolymer is set in a range of formula (1)

$$To-5 > T > To-60 \qquad (1)$$

and T [° C.] is a melting point of a polymer composed of a component constituting the hard segment.

3. The polybutylene naphthalate-based resin composition according to claim 1, wherein the hydrolysis inhibitor is composed of a compound having a carbodiimide skeleton.

4. The polybutylene naphthalate-based resin composition according to claim 1, wherein the inorganic porous filler is composed of fired clay.

5. A polybutylene naphthalate-based resin composition consisting of a polybutylene napthalate resin, a polyester block copolymer, a magnesium hydroxide, a hydrolysis inhibitor, and an inorganic porous filler, wherein an amount of the polyester block copolymer is 50 to 150 pts. wt., an amount of the magnesium hydroxide is 10 to 30 pts. wt., an amount of the hydrolysis inhibitor is 2 to 7 pts. wt., an amount of the inorganic porous filler is 0.5 to 5 pts. wt., and an amount of the polybutylene naphthalate resin is 100 pts. wt.

6. The polybutylene naphthalate-based resin composition according to claim 5, wherein the polyester block copolymer is a polyester block copolymer having 20 to 70 wt % of a hard segment and 80 to 30 wt % of a soft segment, the hard segment made of polyester composed of 60 mol % or more of polybutylene terephthalate, and the soft segment made of polyester having 99 to 90 mol % of aromatic dicarboxylic acid and 1 to 10 mol % of a C6-C12 straight-chain aliphatic dicarboxylic acid as acid components, and a C6-C12 straight-chain diol as a diol component, and wherein a melting point T [° C.] of the polyester block copolymer is set in a range of formula (1)

$$To-5 > T > To-60 \quad (1)$$

and T [° C.] is a melting point of a polymer composed of a component constituting the hard segment.

7. The polybutylene naphthalate-based resin composition according to claim 5, wherein the hydrolysis inhibitor is composed of a compound having a carbodiimide skeleton.

8. The polybutylene naphthalte-based resin composition according to claim 5, wherein the inorganic porous filler is composed of fired clay.

9. An electric wire comprising:
a first insulating coating layer coated on a conductor, the first insulating coating layer formed from a polyester resin composition containing polyester resin, a hydrolysis inhibitor, and fired clay; and
a second insulating coating layer coated on the first insulating coating layer, the second insulating coating formed from the polybutylene naphthalate-based resin composition according to claim 5.

10. The electric wire according to claim 9, wherein the polyester resin of the polyester resin composition is a polybutylene naphthalate resin, and the polyester resin composition comprises 0.5 to 3 pts. wt. of the hydrolysis inhibitor and 0.5 to 3 pts. wt. of the fired clay, and 100 pts. wt. of the polybutylene naphthalate resin.

11. The electric wire according to claim 9, wherein a thickness of the first insulating coating layer is about 0.01 to 0.1 mm.

12. An electric wire having an insulating coating layer formed on a conductor, the insulating coating layer formed from a polybutylene napthalate-based resin composition consisting of a polybutylene naphthalate resin, a polyester block copolymer, a magnesium hydroxide, a hydrolysis inhibitor, and an inorganic porous filler, wherein an amount of the polyester block copolymer is 40 to 150 pts. wt., an amount of the magnesium hydroxide is 10 to 30 pts. wt., an amount of the hydrolysis inhibitor is 0.5 to 5 pts. wt., an amount of the inorganic porous filler is 0.5 to 5 pts. wt., and an amount of the polybutylene naphthalate resin is 100 pts. wt.

13. The electric wire according to claim 12, wherein the polyester block copolymer is a polyester block copolymer having 20 to 70 wt % of a hard segment and 80 to 30 wt % of a soft segment, the hard segment made of polyester composed of 60 mol % or more of polybutylene terephthalate, and the soft segment made of polyester having 99 to 90 mol % of aromatic dicarboxylic acid and 1 to 10 mol % of a C6-C12 straight-chain aliphatic dicarboxylic acid as acid components, and a C6-C12 straight-chain diol as a diol component, and wherein a melting point T [° C.] of the polyester block copolymer is set in a range of formula (1)

$$To-5 > T > To-60 \quad (1)$$

and T [° C.] is a melting point of a polymer composed of a component constituting the hard segment.

14. The electric wire according to claim 12, wherein the hydrolysis inhibitor is composed of a compound having a carbodiimide skeleton.

15. The electric wire according to claim 12, wherein the inorganic porous filler is composed of fired clay.

16. The electric wire according to claim 12, wherein a thickness of the insulating coating layer is about 0.1 to 0.5 mm.

17. An electric wire having an insulating coating layer formed on a conductor, the insulating coating layer formed from a polybutylene naphthalate-based resin composition consisting of a polybutylene napthalate resin, a polyester block copolymer, a magnesium hydroxide, a hydrolysis inhibitor, and an inorganic porous filler, wherein an amount of the polyester block copolymer is 50 to 150 pts. wt., an amount of the magnesium hydroxide is 10 to 30 pts. wt., an amount of the hydrolysis inhibitor is 2 to 7 pts. wt., an amount of the inorganic porous filler is 0.5 to 5 pts. wt., and an amount of the polybutylate naphthalate resin is 100 pts. wt.

18. The electric wire according to claim 17, wherein the polyester block copolymer is a polyester block copolymer having 20 to 70 wt % of a hard segment and 80 to 30 wt % of a soft segment, the hard segment made of polyester composed of 60 mol % or more of polybutylene terephthalate, and the soft segment made of polyester having 99 to 90 mol % of aromatic dicarboxylic acid and 1 to 10 mol % of a C6-C12 straight-chain aliphatic dicarboxylic acid as acid components, and a C6-C12 straight-chain diol as a diol component, and wherein a melting point T [° C.] of the polyester block copolymer is set in a range of formula (1)

$$To-5 > T > To-60 \quad (1)$$

and T [° C.] is a melting point of a polymer composed of a component constituting the hard segment.

19. The electric wire according to claim 17, wherein the hydrolysis inhibitor is composed of a compound having a carbodiimide skeleton.

20. The electric wire according to claim 17, wherein the inorganic porous filler is composed of fired clay.

21. The electric wire according to claim 17, wherein a thickness of the insulating coating layer is about 0.1 to 0.5 mm.

* * * * *